Sept. 16, 1952  P. P. WUERTZ  2,610,575
SIDE TENSIONER FOR BALES
Filed Jan. 3, 1949  3 Sheets-Sheet 1
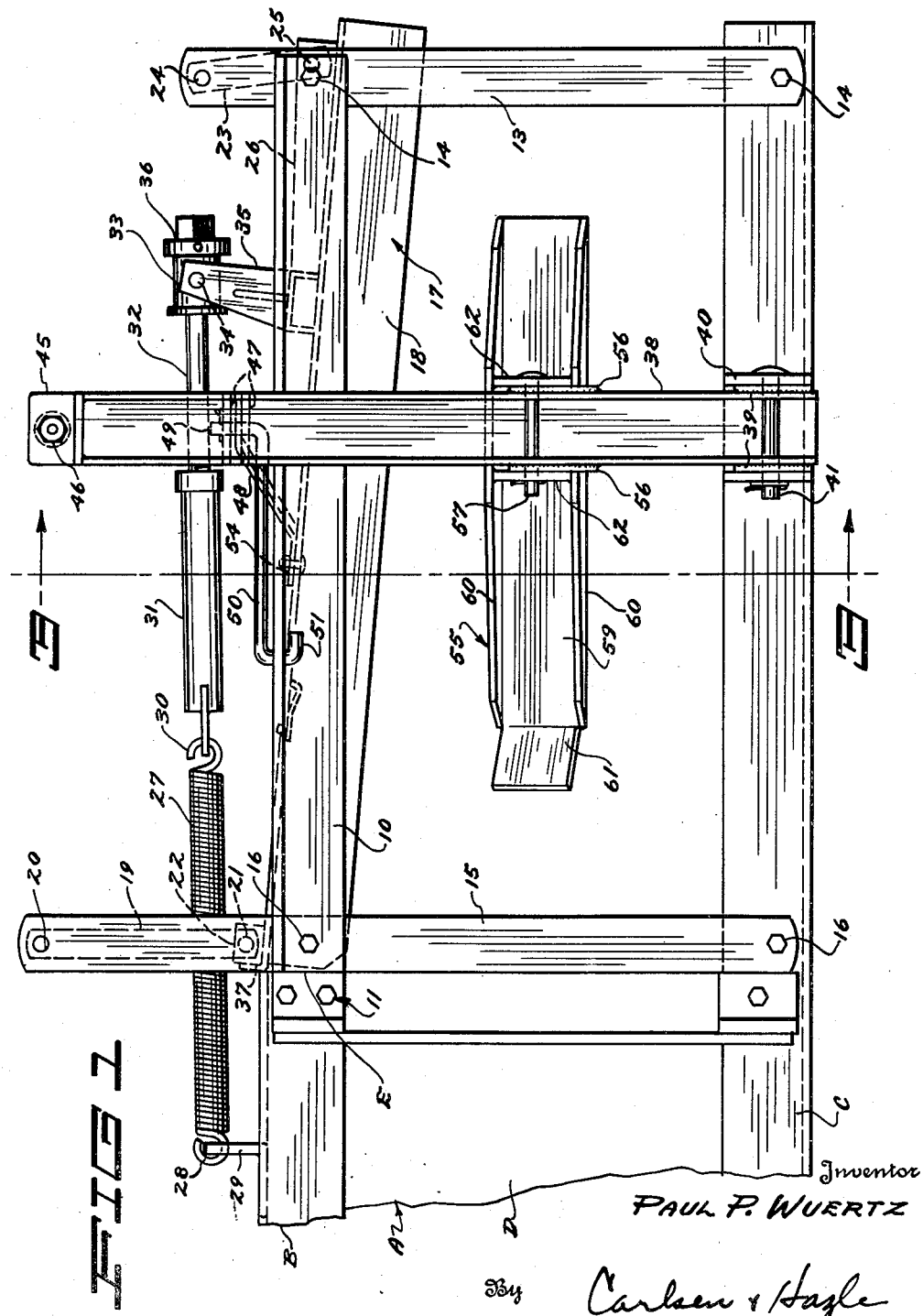
Inventor
PAUL P. WUERTZ
By Carlsen & Hagle Sept. 16, 1952 P. P. WUERTZ 2,610,575
SIDE TENSIONER FOR BALES
Filed Jan. 3, 1949 3 Sheets-Sheet 2
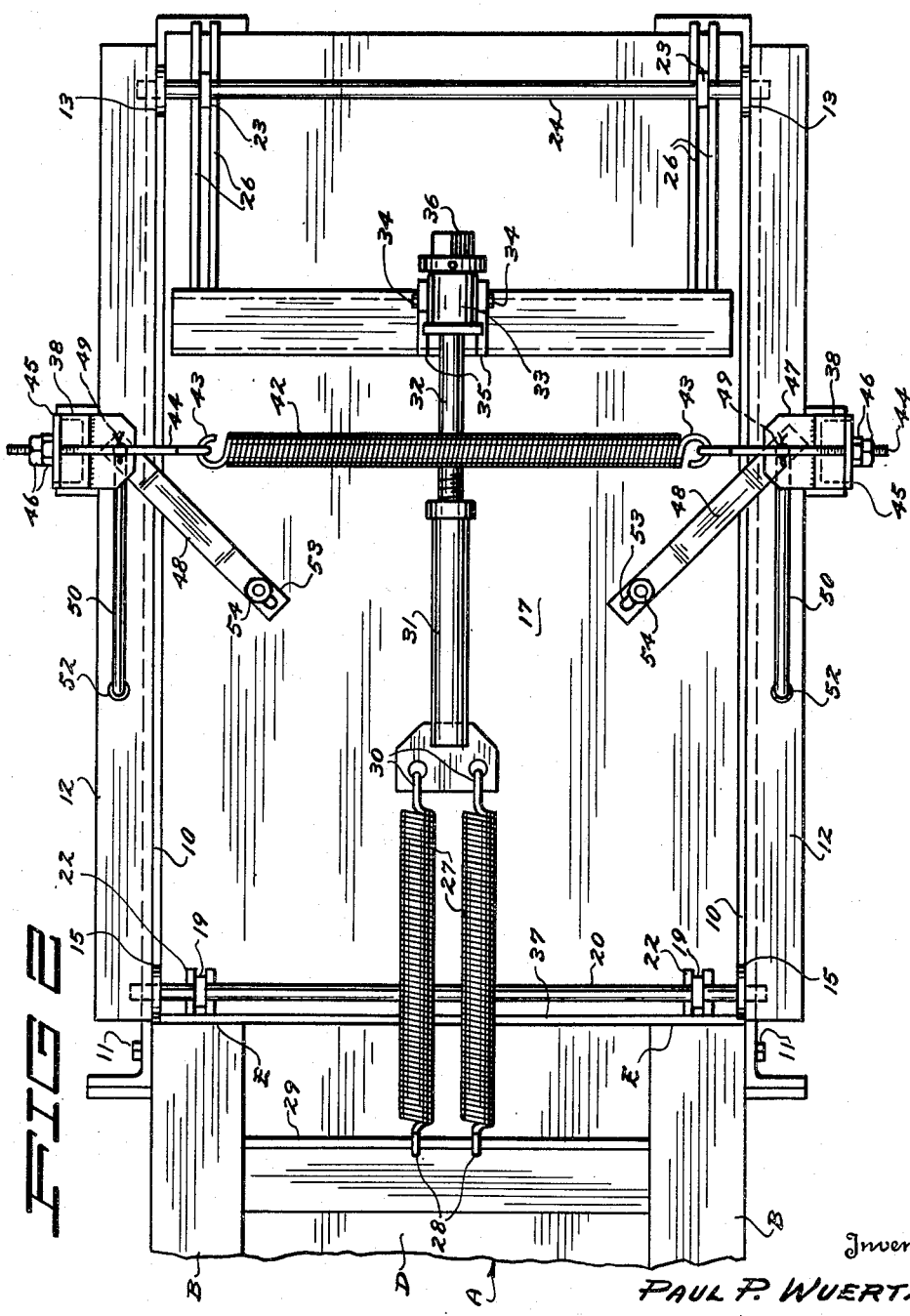
Inventor
PAUL P. WUERTZ
By Carlsen + Hazle

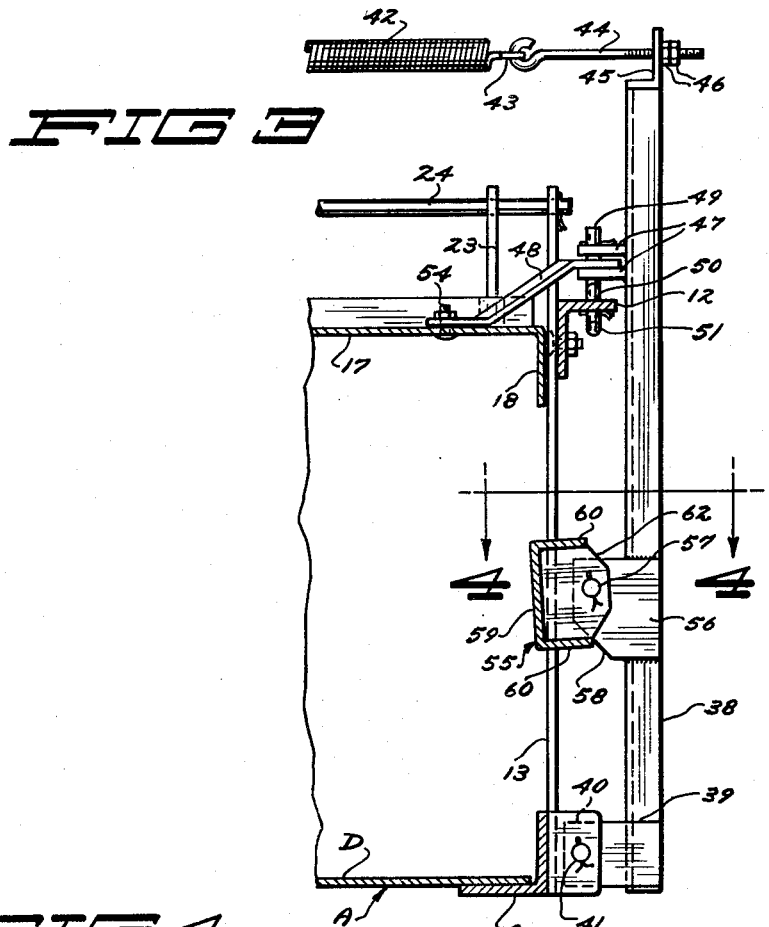
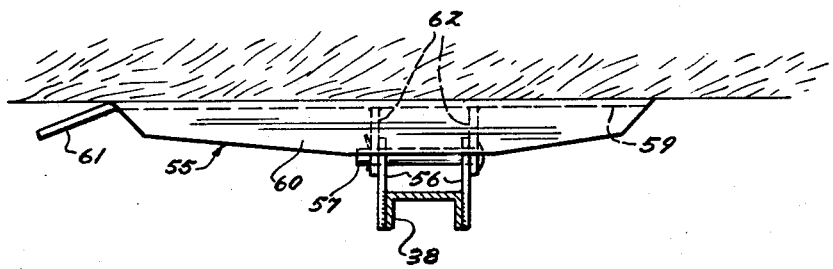

Patented Sept. 16, 1952

2,610,575

UNITED STATES PATENT OFFICE 2,610,575

SIDE TENSIONER FOR BALES

Paul P. Wuertz, Melrose, Minn., assignor, by mesne assignments, to Minneapolis-Moline Company, Hopkins, Minn., a corporation of Minnesota Application January 3, 1949, Serial No. 68,890

7 Claims. (Cl. 100—192)

This invention relates to improvements in bale tensioning devices for hay balers.

The ordinary hay baling machine includes a bale case having a bale chamber wherein the hay is compressed by the bale plunger and, after being tied, the bale is ejected from the chamber through an open end thereof. Each compressed bale in succession acts as a head against which the next succeeding bales are gradually compressed and accumulated and thus, as is well understood by those skilled in this art, the facility with which each bale moves out through the open end of the bale chamber controls the density and weight of the bales that follow. It is therefore customary to provide adjustable means by which pressure may be exerted on the bale after it is completed in order thus to regulate the density and the weight of the bales.

The present invention supplements that forming the subject matter of my prior co-pending application for Bale Tensioning Mechanism, Serial No. 777,773, filed October 3, 1947, wherein there is provided a bale tensioning plate swingably supported in the path of one side of the bale as it leaves the baling chamber and yieldably tensioned in such manner as to permit very sensitive and precise adjustments of the frictional resistance offered to the passing of the bale. As the bale passes this plate swings away from the bale and in the direction of travel thereof, and for the present invention I make use of this movement of the bale tensioning plate to actuate shoes engaging two opposite sides of the bale adjacent that engaged by the plate. These shoes exert added frictional resistance to the passing of the bale and, in addition to facilitating the adjustment of the bale tension according to the bale density desired, the shoes have the further and valuable function of making a better shaped and smoother bale.

Another object of the present invention is to provide a side tensioning mechanism for bales which is completely automatic in its operation and which in conjunction with the tensioning plate of my earlier application is of value in baling hay wherein occasional batches of green stuff are encountered in preventing the now quite prevalent tendency toward choking or clogging caused by the increased frictional effect of the green hay in comparison to the dry stuff.

These and other more detailed and specific objects will be disclosed in the course of the following specification reference being had to the accompanying drawing, in which—

Fig. 1 is a side elevation of the delivery end of the hay baler or the baling chamber thereof, showing my improved side tensioning means in conjunction with the tensioning plate of my prior application.

Fig. 2 is a plan view of the structure shown in Fig. 1.

Fig. 3 is a vertical cross-sectional view through one side of the structure and taken along the line 3—3 in Fig. 1.

Fig. 4 is a horizontal sectional view along the line 4—4 in Fig. 3, and showing also the side portion of a bale passing the side tensioning shoe.

Referring now more particularly and by reference characters to the drawings, a rear or delivery end portion of a hay baling chamber is indicated generally at A, and this chamber is rectangular in cross-section and formed by upper and lower bars or angles B and C, which define the corners of the chamber and which are joined by bale case plates indicated throughout at D. The bales are accumulated in the chamber A by the usual bale plunger and associated elements not here shown, and as each bale is completed it moves out through the open rear end of the chamber or to the right as viewed in Fig. 1. As each bale moves in this direction, by the pressure of the next bale while it is being formed, the completed bale acts as a head or a support against which the bales may be accumulated as has been described above.

In accordance with my invention the upper bale case angles B are cut short as indicated at E and the upper and the two side bale case plates D also terminate at the same point. I then substitute for these upper angles B side bars 10 which are firmly secured as indicated at 11 and in any suitable fashion to the rear ends of the angles B. The side bars 10 extend out to the delivery end of the baling chamber and as here shown these bars 10 take the form of angles having their horizontal webs 12 turned outwardly as clearly shown in Fig. 3.

The rear ends of the side bars 10 and of the lower angle C are joined by upright support bars 13 bolted or otherwise secured in place as indicated at 14. The forward ends of the side bars 10 are similarly joined to the lower angles C by forward support bars 15 fastened as indicated at 16. The rear support bars 13 extend above the baling chamber some distance as best shown in Fig. 1 and the forward bars 15 also project above but to a considerably greater height.

Provided in the rectangular open space thus formed at the top of the baling chamber adjacent its rear end, there is a bale tensioning plate indicated generally at 17 of proper size and shape to substantially completely close this opening. The sides of the plate 17 are turned downwardly in the form of stiffening flanges 18 which also serve to guide upper corners of the bales passing therebeneath as will be readily understood. The tensioning plate is movably supported or swingably suspended at its forward end by hanger links 19 which are pivotally mounted at their upper ends to a cross rod 20 joining the upper ends of the forward support bars 15. The lower ends of the links 19 are pivotally attached by pins 21 to apertured ears 22 fastened at this forward end of the plate. In a similar fashion the rear end of the plate is swingably suspended by hanger links 23 pivoted at upper ends on a cross rod 24 extending through and between the upper ends of the rear support bars 13. The lower ends of the rear hanger links 23 are pivoted by pins 25 between the rear ends of transversally spaced pairs of ribs 26 welded lengthwise on the rear end portion of the tensioning plate. The arrangement is such that the tensioning plate is supported for oscillating or swinging movements in a generally horizontal and forward and rearwardly extending plane above and with respect to the rear or delivery end of the baling chamber. It will be noted that in its normal position, as shown in Fig. 1, the tensioning plate 17 inclines downwardly and rearwardly so that a passing bale must swing the plate upwardly and rearwardly as it emerges from the chamber.

Such movement of the tensioning plate 17 by the passing bale is yieldably resisted by two or more heavy retractile coil springs 27 which are attached at their forward ends at 28 to a bracket 29 on the rear end of the upper bale case plate D. The rear ends of the springs 27 are attached at 30 to a tubular adjusting member 31 having a bore tapped to receive a screw 32, the rear end of which is journaled through a collar 33. This collar is trunnioned at 34 in brackets 35 secured to the rear portion of the tensioning plate while fastened to the screw 32, rearwardly of the collar is a squared collar 36 or any other suitable means by which the screw 32 may be turned. It will be obvious that the forward tension or pull of the springs 27 will thus normally swing the tensioning plate 17 in the same direction holding its forward end 37 against the rear edge of the upper bale case plate D and that the springs will thus resist the aforesaid rearward swinging movement of the plate by the bales, and this resistance may be readily adjusted by turning a screw 32 to stretch or relax the springs 27.

As has been pointed out in more detail in my prior application the tensioning plate 17 permits the convenient adjustment of the frictional resistance offered to the passage of the bales in such fashion as to permit the density of the following bales to be readily adjusted. Inasmuch as the plate swings through a substantial range in its operation and has an arcuate motion upon its hanger links 19 and 23 the bale density is quite precisely proportional to the friction exerted by the bale upon the plate. This has the desirable effect of preventing clogging and prevents the occasionally encountered green stuff in the hay from temporarily greatly increasing bale density and weight.

Turning now to the present invention I provide additional, cooperating tensioning means for the sides of the bales and such means comprises an upright carrier arm or bar 38 positioned at each side of the open rear end of the baling chamber, between the support bars 13 and 15. The lower end of each carrier arm 38 (Fig. 3) has inwardly turned, apertured lugs 39 positioned between U-shaped clips 40 secured to the lower angles C and a pin 41 pivots the lugs to the clips so that the upper ends of the carrier arms may swing inward and outward with respect to the baling chamber, or in upright, transverse planes. The carrier arms 38 extend some distance above the baling chamber and at an elevation above the tensioning spring assembly previously described the upper ends of the arms are joined by a cross tensioning spring 42 the ends of which are hooked at 43 in eye bolts 44 passing outwardly through lugs 45 secured atop the arms. Nuts 46 on the outer ends of the eye bolts 44 permit the tension of the spring 42 to be adjusted and the spring as thus arranged obviously yieldably draws the carrier arms toward the baling chamber.

Above the level of the side bars 10 each carrier arm 38 has inwardly turned, vertically spaced and apertured ears 47 (Figs. 2 and 3) between which is loosely mounted the rear end of an actuating bar or link 48. This end of the bar 48 is pivoted on a vertical axis to the ears 47 by the upwardly turned rear end 49 of a link rod 50 extending forwardly over the adjacent side bar 10 and hooked at its forward end 51 loosely through an aperture 52 in the upper flange 12 of said bar. The link rods 50 (there being of course one at each side) have the function of resisting rearward thrust on the upper ends of the carrier arms in their operation to be presently described, and the loose fit at 52 is sufficient to permit the carrier arms to move without interference from the links.

The actuating bars 48 extend forwardly, and angle inwardly, from their pivotal attachments 49 with the carrier arms, and at their ends are slotted at 53 to accommodate bolts 54 by which they are attached to the bale tensioning plate 17, as seen in Fig. 2. It will be noted that the bars 48 also angle downwardly to properly meet the plate.

At a level about midway between the side bars 10 and lower bale chamber angles C each carrier arm 38 carries a bale engaging, side tensioning shoe or shoe element designated generally at 55 and for mounting the shoes the arms have inwardly extending bracket plates 56 apertured near inner, upper corners to receive pivot pins 57, and beveled off at their lower inner corners as indicated at 58 in Fig. 3. Each shoe 55 is elongated and rectangular, having a bale engaging surface or sole plate 59 of this shape, from the upper and lower edges of which flanges 60 are turned outwardly. The forward end of the sole plate 59, or the end which first meets the bale, is turned outwardly as indicated at 61 in order not to dig into an approaching bale. Web plates 62 join the upper and lower flanges 60 and are so spaced as to slip loosely over inner ends of the bracket plates 56 and these web plates are further apertured to pivotally receive the pins 57.

As best shown in Figs. 1 and 3 the shoes 55, when no bale is passing between, will hang or swing downwardly at inner sides to a slight angle, until stopped by contact of the lower flanges 60 with the bevelled corners 58 of the bracket plates 56. In this position, however, the shoes will not be so angled that their outwardly turned forward guide ends 61 will not properly receive the approaching bale. As the bale then moves back the shoes will then straighten up and bear with a "floating" pressure (about the pivots 57) on the bale sides.

In operation now, as a bale moves out toward and through the delivery end of the baling chamber, the resulting movement of the tensioning plate 17 is previously described will exert endwise, rearward thrust on the actuating bars 48. Due to the outward-rearward angularity of these bars 48 this thrust will tend to swing the upper ends of the carrier arms 38 outwardly to move the shoes 55 away from the sides of the bale. This movement of the shoes is yieldably resisted by the cross tensioning spring 42 and thus the shoes will be urged against the bale sides to hold them to shape and frictionally resist passage of the bale. The amount of such resistance is determined both by the tension of the spring 42 and by the amount of movement of the tensioning plate 17, which in turn is determined to a major extent by the springs 27. Thus all of the spring adjustments are controlling of the bale density and the adjustments permit very precise control. The slots 53, through which the movement of the tensioning plate 17 is transmitted to the shoe carrier arms 38 do, however, act as lost motion connections and permit some independence in the action of the bale top and side tensioning as will be understood. In practice it is found that the "floating" bale tensioning upon the three adjacent sides of the bales result in the formation of bales of well nigh perfect shape and density with but little variation between bales.

As the plate 17 is moved rearward, or to the right as viewed in Fig. 2, by a tightly compressed bale the actuating links or bars 48 tend to spread the arms 38 and stretch the spring 42 so that its tension frictionally engages the shoes 55 with the sides of the bale. As plate 17 so moves, however, the links 48 approach straight or transversely aligned positions and thus they progressively transfer the increasing tension of spring 42 to the frame of the baler and correspondingly relieve the shoes 55 of this tension to prevent the progressive choking of the baler which so often occurs where the spring tension on the bale itself is continually increased. Again considering Fig. 2 it will be apparent that if plate 17 moves to a point at which the links 48 are actually transversely aligned and parallel with the spring 42 then the tension of the spring will be wholly absorbed by the baler frame and very little pressure will be put on the sides of the bales by shoes 55. Further it will be noted that spring 42 will tend to urge plate 17 forwardly and hence will yieldably resist the rearward movement of this plate by the passing bale but, as the links 48 start to straighten out, this forward force on plate 17 will also diminish, so that no choking can occur from this source.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. For a hay baler having a tensioning plate yieldably supported for engagement with and movement by one side of the bales, a support, carrier arms pivoted on the support, shoe elements carried by the arms and positioned to frictionally engage two sides of the bales contiguous to the side engaged by the tensioning plate, spring mechanism connected to the carrier arms to urge the shoe elements against the bale, and actuating elements connecting the carrier arms and tensioning plate to move the carrier arms and shoe elements.

2. The combination in a hay baling machine having a frame with a bale chamber through which the bales pass as they are formed and a bale engaging plate movably suspended to engage one side of a passing bale and to be moved in the direction of travel of the bale, of carrier arms pivoted to the frame and a spring stretched between the arms and across the tensioning plate to pull the arms toward the path of the bale, means on the arms for engaging the bale at opposite sides, and actuating members connected to the tensioning plate and the arms to spread the latter as the tensioning plate moves during passage of a bale.

3. The combination in a hay baling machine having a frame with a bale chamber through which the bales pass as they are formed and a bale engaging plate movably supported to engage one side of a passing bale and to be moved in the direction of travel of the bale, of carrier arms pivoted to the frame and a spring stretched between the arms and crosswise of the plate to pull the arms toward the path of the bale, means on the arms for engaging the bale at opposite sides, actuating bars pivotally connected to the arms and to the tensioning plate to spread the arms as the tensioning plate is moved during passage of a bale, said bars angling from their pivot connections to the arms inward toward each other and in a direction opposite to the travel of the bales whereby the arms will gradually straighten toward positions aligned with the spring as the plate moves and thereby increasingly divert the tension of the spring to the frame.

4. In a baling machine having a frame and a rearwardly opening bale chamber of rectangular cross section, a tensioning plate in the upper side of the chamber and means swingably suspending the plate so that it will move rearwardly and upwardly as a bale passes, spring means biasing the plate in the opposite direction, carrier arms arranged in upright positions at opposite sides of the bale chamber and pivoted to the frame at their lower ends for movement toward and away from the path of the bales, means on the arms for engaging the opposite sides of the bales, cross tensioning spring means connected to the upper ends of the arms to draw them toward the bale path, and actuating members pivoted to the arms and angling inward and forward therefrom and pivoted at inner ends to the tensioning plate to spread the arms as the plate is moved rearwardly.

5. In a baling machine having a frame and a rearwardly opening bale chamber of rectangular cross section, a bale engaging plate in the upper side of the chamber and means swingably suspending the plate so that it will move rearwardly and upwardly as a bale passes, carrier arms arranged in upright positions at opposite sides of the bale chamber and pivoted to the frame at their lower ends for movement toward and away from the path of the bales, means on the arms for frictionally engaging the opposite sides of the bales, cross tensioning spring means connected to the upper ends of the arms to draw them toward the bale path, and actuating members pivoted to the arms and angling inward and forward therefrom and pivoted at inner ends to the plate to spread the arms as the plate is moved rearwardly, the angle of the actuating members being such that they will be swung to positions substantially in transverse alignment and in alignment with said spring means when the plate approaches its extreme rearward position to thereby absorb an increasing amount of the pull of the cross tensioning spring means.

6. In a baling machine having a frame and a rearwardly opening bale chamber of rectangular cross section, a bale engaging plate in the upper side of the chamber and means swingably suspending the plate so that it will move rearwardly and upwardly as a bale passes, carrier arms arranged in upright positions at opposite sides of the bale chamber and pivoted to the frame at their lower ends for movement toward and away from the path of the bales, means on the arms for frictionally engaging the opposite sides of the bales, cross tensioning spring means connected to the arms to draw them toward the bale path, actuating members pivoted to the arms and angling inward and forward therefrom and pivoted at inner ends to the plate to spread the arms as the plate is moved rearwardly, and link rods connected between the frame and the upper ends of the arms to resist rearward thrust on the arms as the bales move rearwardly between the bale engaging means thereon.

7. For a baling machine having a frame with a baling chamber opening at one end to pass the bales and a plate movably supported in frictional engagement with one side of the bales for movement thereby toward said open end of the chamber, bale tensioning mechanism comprising bale engaging members and means movably supporting said members for movement inward and outward toward and away from opposite sides of bales passing in the chamber, spring means operatively arranged in conjunction with said members and exerting force in a plane crosswise of the direction of travel of the bales to yieldably urge said members inward against the bales, and actuating means connecting said plate to said members for thrusting the latter outwardly and apart as the plate is moved by a passing bale, said actuating means being so angularly related with respect to the direction of movement of the plate and the plane along which the spring force is exerted that said plane and the direction at which the actuating means act to thrust the members apart will coincide after a predetermined movement of the plate.

PAUL P. WUERTZ.

REFERENCES CITED

The following references are of record in the file of this patent:

UNITED STATES PATENTS

| Number | Name | Date |
| --- | --- | --- |
| 434,775 | Gehrt | Aug. 19, 1890 |
| 549,957 | Coles | Nov. 19, 1895 |
| 1,394,458 | Whitney | Oct. 18, 1921 |
| 1,830,623 | Rollman | Nov. 3, 1931 |
| 2,389,510 | Hitchcock | Nov. 20, 1945 |
| 2,470,278 | West et al. | May 17, 1949 |